United States Patent
Masuda et al.

(10) Patent No.: US 6,868,552 B1
(45) Date of Patent: Mar. 15, 2005

(54) INGRESS NOISE CONTROL SYSTEM AND INGRESS NOISE BLOCKING DEVICE

(75) Inventors: Shigefumi Masuda, Kawasaki (JP); Hiroo Tamura, Kawasaki (JP); Minoru Ishida, Kawasaki (JP); Kazunari Inoue, Kamakura (JP); Takayuki Tyou, Kamakura (JP)

(73) Assignees: Fujitsu Limited, Kawasaki (JP); Miharu Communications Co., Ltd., Kamakura (JP)

( * ) Notice: Subject to any disclaimer, the term of this patent is extended or adjusted under 35 U.S.C. 154(b) by 581 days.

(21) Appl. No.: 09/589,426

(22) Filed: Jun. 7, 2000

(30) Foreign Application Priority Data

Jun. 7, 1999 (JP) .............................................. 11-159438

(51) Int. Cl.[7] .............................................. H04N 7/173
(52) U.S. Cl. ........................ 725/125; 725/126; 725/127
(58) Field of Search ............................... 725/124, 125, 725/127, 128; 327/552

(56) References Cited

U.S. PATENT DOCUMENTS

| | | | | | |
|---|---|---|---|---|---|
| 4,928,272 | A | * | 5/1990 | Ohue | 725/125 |
| 4,982,440 | A | * | 1/1991 | Dufresne et al. | 725/125 |
| 5,719,792 | A | * | 2/1998 | Bush | 702/190 |
| 5,745,836 | A | * | 4/1998 | Williams | 725/125 |
| 5,893,024 | A | * | 4/1999 | Sanders et al. | 725/125 |
| 5,937,330 | A | * | 8/1999 | Vince et al. | 725/125 |
| 6,094,211 | A | * | 7/2000 | Baran et al. | 725/125 |
| 6,160,990 | A | * | 12/2000 | Kobayashi et al. | 725/135 |
| 6,321,384 | B1 | * | 11/2001 | Eldering | 725/125 |

FOREIGN PATENT DOCUMENTS

| | | |
|---|---|---|
| JP | 7-284083 | 10/1995 |
| JP | 7-307937 | 11/1995 |
| JP | 9-162788 | 6/1997 |

* cited by examiner

Primary Examiner—John Miller
Assistant Examiner—Scott Beliveau
(74) Attorney, Agent, or Firm—Katten Muchin Zavis Rosenman

(57) ABSTRACT

The present invention concerns an ingress noise control system and an ingress noise blocking device which are used in a cable system to suppress ingress noise. In the cable system providing two-way communication using different frequency bands for transmission of upstream and downstream signals, the ingress noise control system includes, within a distribution unit, a two-way amplification unit, etc. provided in an upstream signal transmission path, a synchronous detection controller 6 for synchronously detecting the upstream signal transmitted from terminal equipment and separated by a low-pass filter 4 in a second separation filter 2, a gate switch circuit 5 which is turned on by the synchronous detection controller 6 to pass the upstream signal only when the upstream signal is synchronously detected, and an indicator 7 for indicating the on/off state of the gate switch circuit 5.

6 Claims, 5 Drawing Sheets

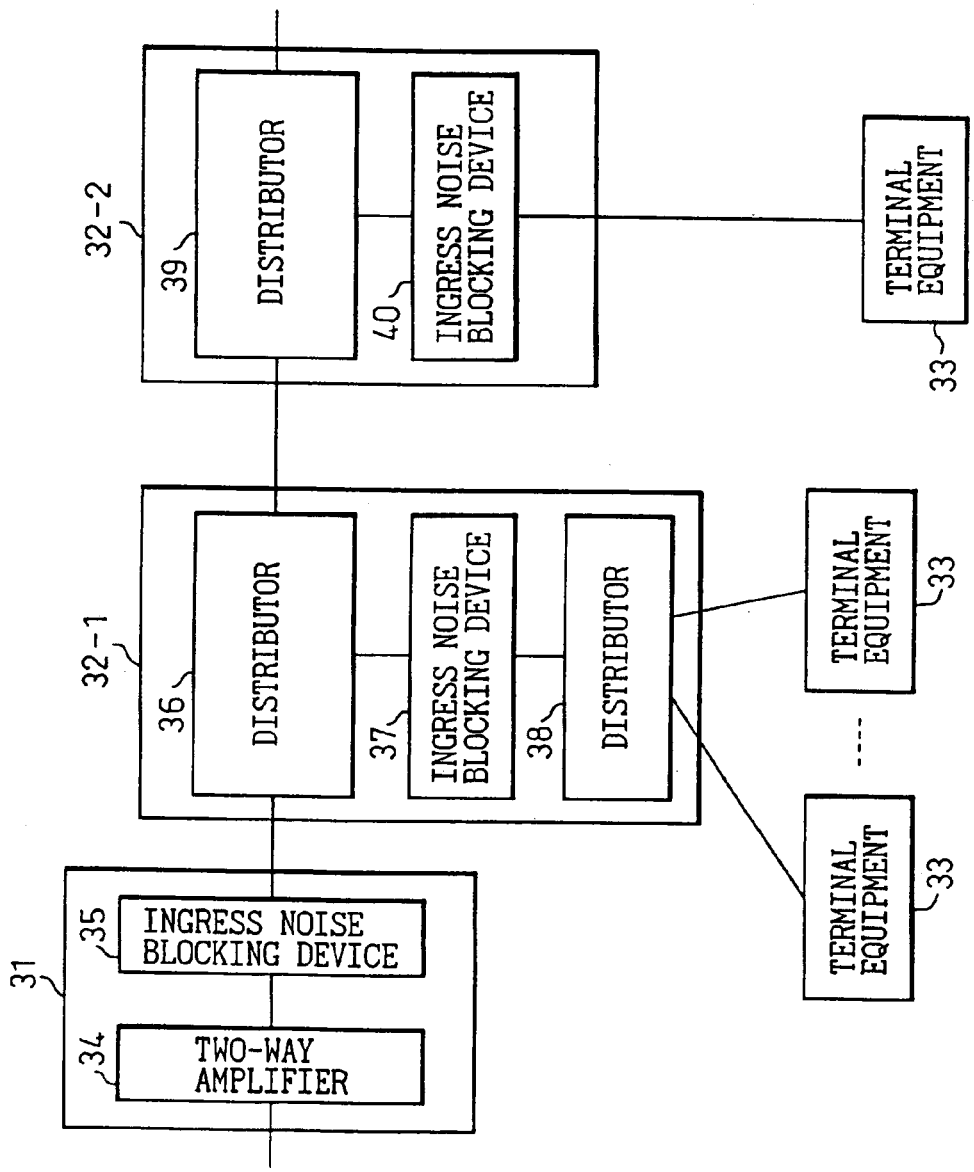

INGRESS NOISE CONTROL SYSTEM AND INGRESS NOISE BLOCKING DEVICE

BACKGROUND OF THE INVENTION

1. Field of the Invention

The present invention relates to an ingress noise control system and an ingress noise blocking device which are used in a cable system.

A cable system is known that provides two-way communication using different frequency bands for transmission of upstream and downstream signals. In such a system, upstream signals from many users (terminal equipments) are combined for transmission to a head end (center). At this time, noise from each user (terminal equipment) is also coupled into the signal stream, causing S/N degradation. There is therefore a need to reduce this noise.

2. Description of the Related Art

FIG. 1 is an explanatory diagram of a CATV system, in which reference numeral 51 is a center, 52 is a two-way amplifier, 53-1 and 53-2 are distributors, and 54-11, 54-12, . . . , 54-21, . . . are terminal equipments. The CATV system can be built to provide various communication services such as on-demand CATV, cable telephony, Internet connections, etc. via coaxial cable or optical fiber transmission line.

The two-way amplifier 52 is included to amplify signals attenuated in transmission, and a plurality of such amplifiers are provided in the CATV system, depending on the transmission distance. The distributors 53-1 and 53-2 connect between the trunk transmission line and the plurality of terminal equipments, and each distributor employs, for example, an eight-branch design. The available spectrum is divided into two frequency bands, for example, a frequency band of 5 MHz to 55 MHz for upstream signals and a frequency band of 70 MHz to 770 MHz for downstream signals, enabling the upstream and downstream signals to be separated from each other according to the frequency band. For the modulation scheme, it is common to employ phase modulation such as BPSK, QPSK, QAM, or the like. Transmission rates heretofore known include 160 kbps, 320 kbps, 640 kbps, 2560 kbps or 256 kbps, 1544 kbps, 3088 kbps, etc.

Downstream signals from the center (head end) 51 are distributed through the distributors 53-1 and 53-2 to the respective branch transmission lines for transmission to the terminal equipments 54-11, 54-12, . . . , 54-21, . . . On the other hand, upstream signals from the respective terminal equipments are transmitted toward the center 51 through the opposite path to that for the downstream signals. In that case, the upstream signals are combined together in the distributors.

The upstream signals are transmitted from the terminal equipments toward the center 51 via the distributors 53-1 and 53-2; at this time, noise components from each terminal equipment are added in the signal stream. This added noise is known as ingress noise. If the ingress noise is due to induction, etc. from radio circuitry, it is known to provide a system that transmits the upstream signal by converting its frequency to a frequency different from that of the radio circuitry.

However, when a user terminal equipment is removed because the user is moving or for other reason, the transmission line will be left open, allowing a high level of noise to enter. This kind of noise cannot be reduced by frequency conversion. Furthermore, since the signal component is zero and only the noise component is transmitted, the noise is sequentially summed through the distributors 53-1 and 53-2, increasing the ingress noise and thus significantly degrading S/N; this can render the discrimination of upstream signals impossible at the center and can lead to a system down situation.

SUMMARY OF THE INVENTION

In view of the above-outlined problems, it is an object of the present invention to eliminate the effects of such ingress noise.

The present invention provides (1) an ingress noise control system for use in a CATV system providing two-way communication using different frequency bands for transmission of upstream and downstream signals, wherein an ingress noise blocking device which includes a synchronous detection controller and a gate switch circuit, and which turns on the gate switch circuit only when an upstream signal is synchronously detected, to pass the upstream signal therethrough, is provided in an upstream signal transmission path.

(2) The ingress noise control system can be constructed to include a configuration for judging whether or not the upstream signal is a valid upstream signal, based on the spectrum of the upstream signal when the upstream signal is synchronously detected by the synchronous detection controller, and for turning on the gate switch circuit to pass the valid upstream signal therethrough only when the upstream signal is judged to be a valid upstream signal.

(3) The ingress noise blocking device of the present invention comprises: first and second separation filters for separating upstream and downstream signals using different frequency bands in a two-way CATV system; a gate switch circuit for passing or not passing the upstream signal between the first and second separation filters; and a synchronous detection controller for turning on the gate switch circuit only when the upstream signal is synchronously detected.

(4) The ingress noise blocking device can be constructed to include a synchronous detection judging unit which obtains the spectrum of the upstream signal synchronously detected by the synchronous detection controller, and which, based on the ratio of signal levels at predetermined frequencies, judges whether or not the upstream signal is a valid upstream signal, and turns on the gate switch circuit only when the upstream signal is judged to be a valid upstream signal.

(5) The synchronous detection controller can be configured as a differential detection circuit which includes a delay circuit for delaying the upstream signal and a synchronous detector for multiplying the upstream signal with the signal delayed by the delay circuit.

BRIEF DESCRIPTION OF THE DRAWINGS

The present invention will be more clearly understood from the description as set forth below with reference to the accompanying drawings.

FIG. 5 is an explanatory diagram of the embodiment of the present invention.

DESCRIPTION OF THE PREFERRED EMBODIMENTS

Figure 1:
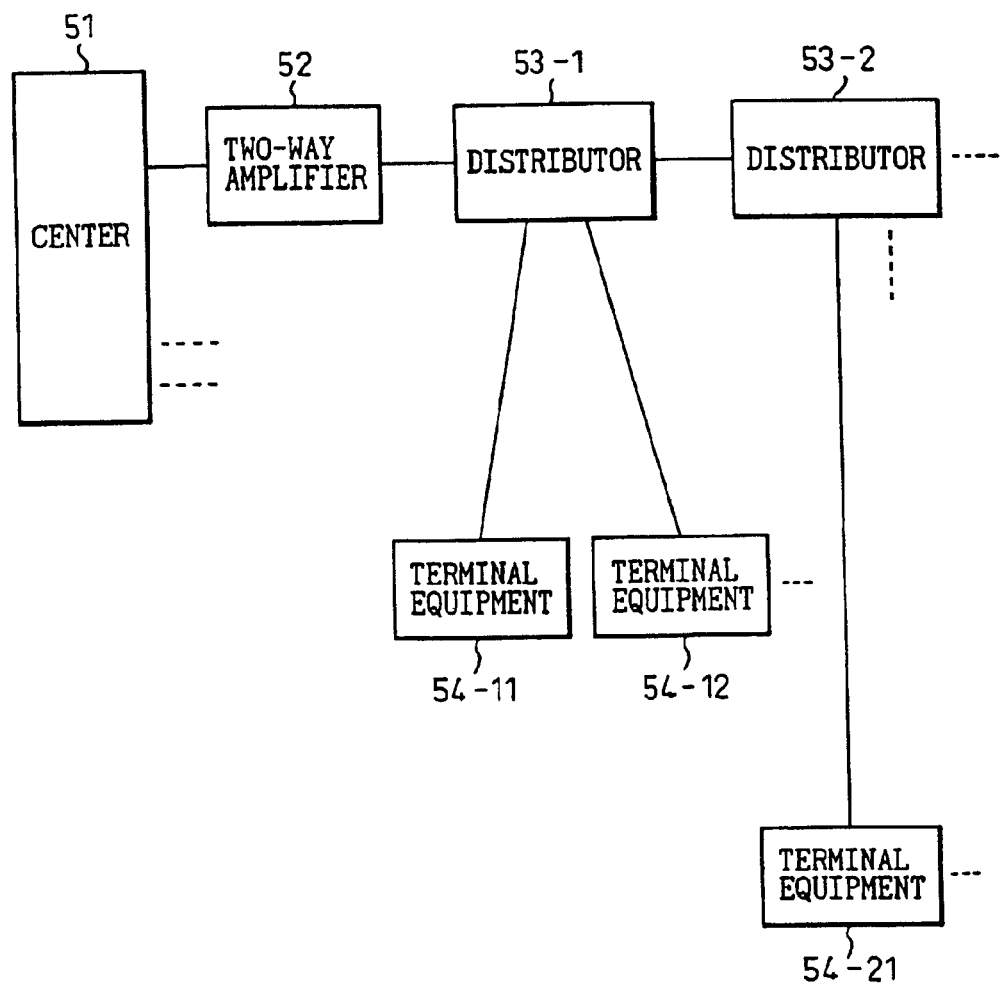
FIG. 1 is an explanatory diagram of a CATV system.
Figure 2:
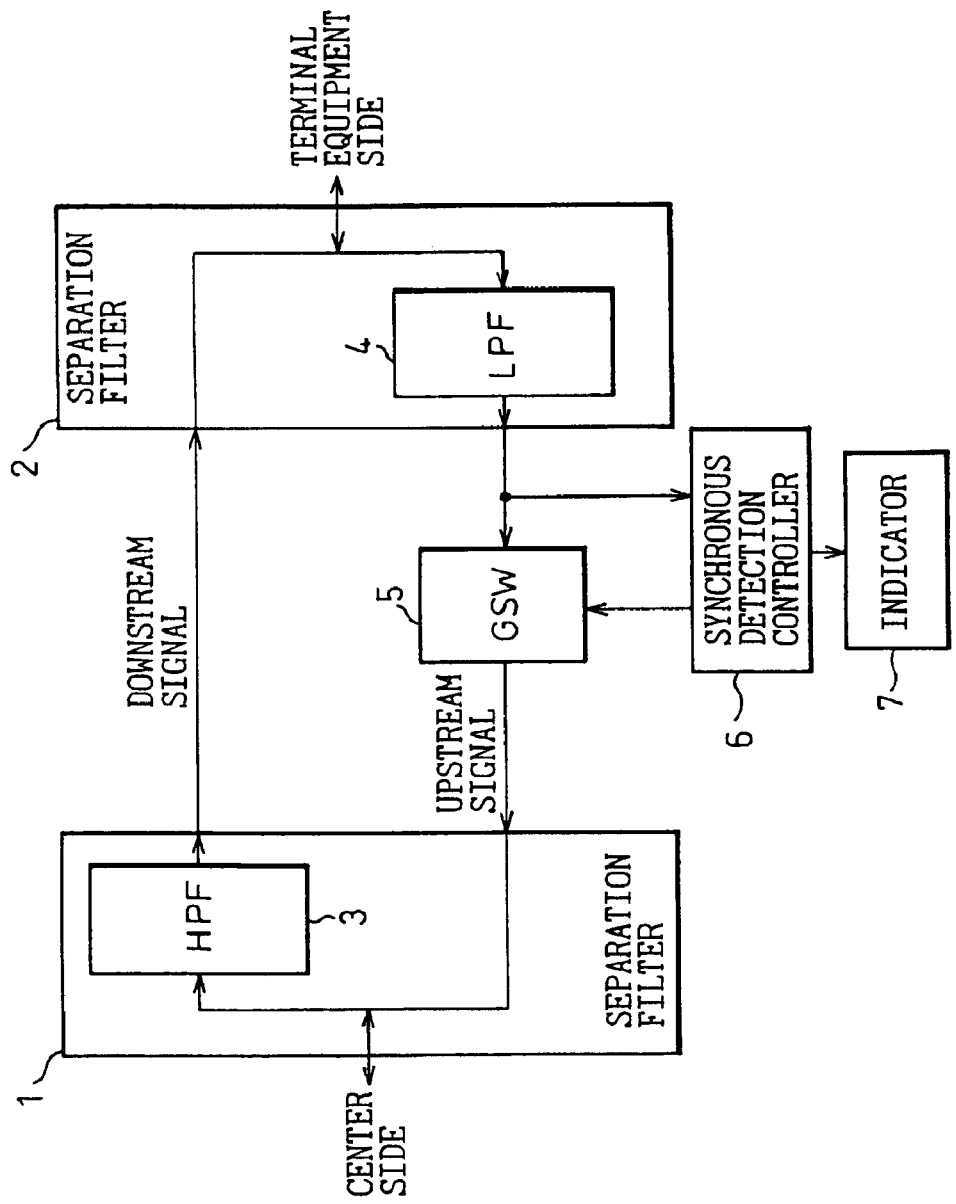
FIG. 2 is an explanatory diagram of an ingress noise blocking device according to an embodiment of the present invention.

FIG. 2 is an explanatory diagram of an ingress noise blocking device according to an embodiment of the present invention, in which reference numerals 1 and 2 are first and second separation filters, respectively, 3 is a high-pass filter (HPF), 4 is a low-pass filter (LPF), 5 is a gate switch circuit (GSW), 6 is a synchronous detection controller, and 7 is an indicator. This ingress noise blocking device is installed in an upstream signal path. A downstream signal from the center is separated by the high-pass filter 3 in the first separation filter 1. An upstream signal from the terminal equipment side is separated by the low-pass filter 4 in the second separation filter 2. The upstream signal is input to the gate switch circuit 5 and also to the synchronous detection controller 6. The gate switch circuit 5 is a high-frequency switch circuit constructed from a transistor, a diode, or the like, and is controlled on and off by the synchronous detection controller 6. The upstream signal is blocked when this switch is turned off.

The downstream and upstream signals are transmitted using phase modulation such as BPSK, QPSK, QAM, or the like, as previously noted. The synchronous detection controller 6 demodulates the upstream signal for detection or differential detection, and detects whether or not the signal is a valid signal. If the signal consists only of noise components, synchronous detection is not possible, and the gate switch circuit 5 is turned off. This prevents the noise components from being transmitted to the center. Ingress noise can thus be blocked. On the other hand, if the signal is a valid signal, synchronous detection is possible, so that the gate switch circuit 5 is turned on to pass the valid upstream signal for transmission to the center. At the time of the synchronous detection, a visual indication that the upstream signal is being transmitted can be provided using the indicator 7 constructed from a light-emitting diode or a lamp.

Figure 3:
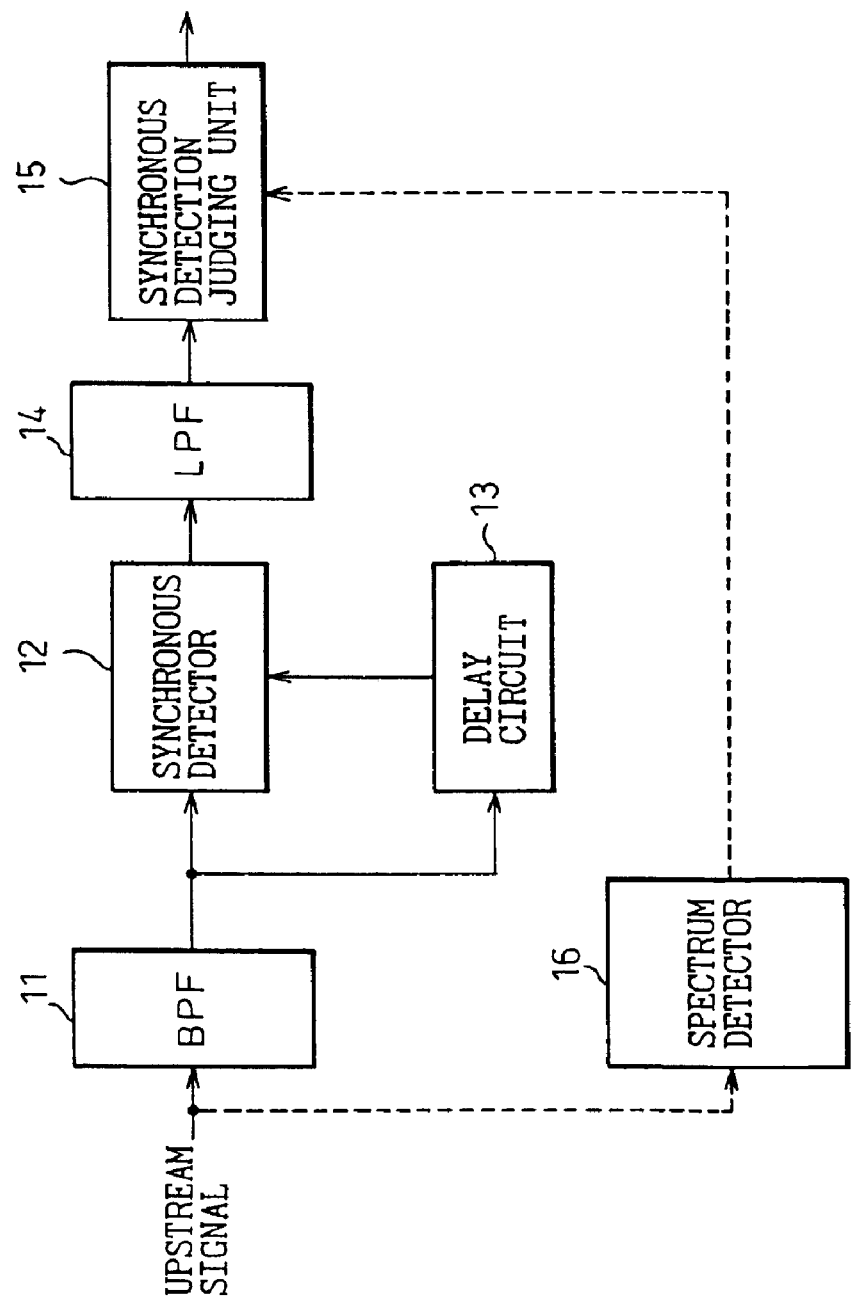
FIG. 3 is an explanatory diagram of a synchronous detection controller according to the embodiment of the present invention.

FIG. 3 is an explanatory diagram of the synchronous detection controller according to the embodiment of the present invention, in which reference numeral 11 is a band-pass filter (BPF), 12 is a synchronous detector, 13 is a delay circuit, 14 is a low-pass filter (LPF), 15 is a synchronous detection judging unit, and 16 is a spectrum detector.

The synchronous detection controller shown in this embodiment is configured to differentially detect phase modulated upstream signals. An upstream signal is input to the synchronous detector 12 and the delay circuit 13 via the band-pass filter 11; in the synchronous detector 12, the upstream signal is multiplied by the signal delayed through the delay circuit 13, and the synchronously detected output signal is fed into the low-pass filter 14 where its high-frequency components are removed to obtain the baseband signal. When the baseband signal is obtained, the synchronous detection judging unit 15 judges that an upstream signal has been input, and turns on the gate switch circuit 5 in FIG. 2, while presenting a visual indication of this ON state, for example, by illuminating the indicator 7.

The spectrum detector 16 detects the spectrum of the upstream signal; if the signal consists only of noise, the spectral levels are nearly equal over the entire frequency range. On the other hand, in the case of a valid upstream signal, the spectral level of the signal component becomes larger. When it is judged that an upstream signal has been input, based on the signal passed through the low-pass filter 14, there are cases where the noise has been synchronously detected; therefore, the synchronous detection judging unit 15 judges the spectral level of the signal component at that time and, if the signal component level is large, then determines that the signal that has been input is no doubt a valid upstream signal.

Figure 4:
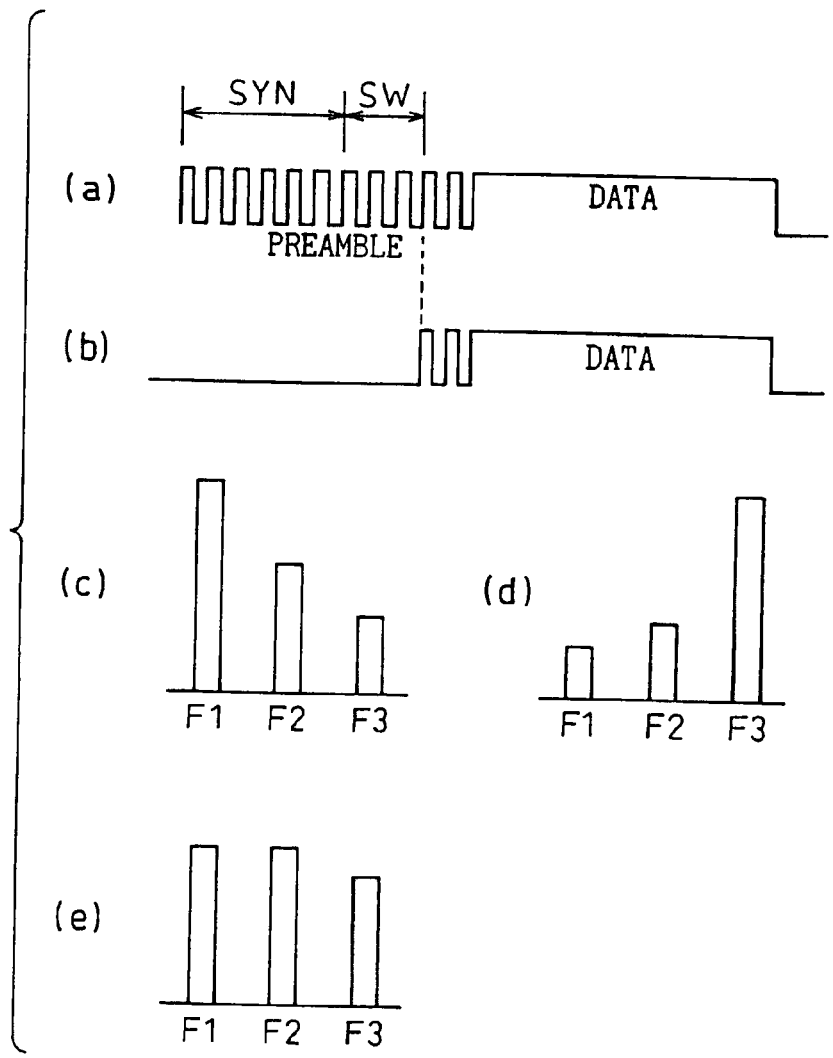
FIG. 4 is a diagram for explaining the operation of the embodiment of the present invention.

FIG. 4 is a diagram for explaining the operation of an embodiment of the present invention in which part (a) is a schematic depiction of burst transmission data consisting of a preamble and data, where SYN denotes the period required in the synchronous detection controller 6 (see FIG. 2) for synchronous detection and SW indicates the period during which the gate switch circuit 5 is held in the on state. The preamble contains bits for bit synchronization, etc. and, using these bits, the synchronous detection controller 6 carries out synchronous detection.

If it is assumed that the signal is a baseband signal with a periodic phase modulation such as $\pi, 0, \pi, 0, \ldots$, the synchronization part of the preamble is, for example, "101010 . . . ". Accordingly, when such a baseband signal pattern is obtained, it can be determined that the upstream signal has been synchronously detected but, in the case of other patterns, it can be determined that noise has been detected. When the upstream signal is synchronously detected, the gate switch circuit 5 is turned on to let the upstream signal pass through. Therefore, before the gate switch circuit 5 is turned on, the upstream signal is transmitted to the center with a portion of the preamble omitted as shown in part (b). Here, the preamble is set to have a sufficient length if a portion of it is omitted, even in the case of the ordinary burst transmission data.

Parts (c), (d), and (e) each show the levels of the frequencies F1, F2, and F3 detected by the spectrum detector 16 in FIG. 3. If all the levels are nearly equal as shown in part (e), for example, it is determined that the signal consists only of noise. That is, since the noise is distributed over the wide frequency range, the levels of the frequencies F1, F2, and F3 are nearly equal. On the other hand, when the signal component consists, for example, of the frequency F1, then if the level of this frequency F1 is larger than those of the other frequencies F2 and F3 as shown in part (c), it is determined that the signal is a valid upstream signal. When the signal component consists of the frequency F3, as shown in part (d), it is likewise determined that the signal is a valid upstream signal. Alternatively, the spectral distribution such as shown in part (c) is compared with a prestored signal spectrum and, if they match, it is determined that the signal is a valid one. As a result, when it is determined that the signal has been synchronously detected, as described above, if the signal is judged to be a valid signal based on the detection output of the spectrum detector 16, the synchronous detection judging unit 15 determines that the signal is no doubt a valid upstream signal, and turns on the gate switch circuit 5. On the other hand, in the case of the spectrum consisting only of noise as shown in part (e), the signal is judged to be noise, and the gate switch circuit 5 is turned off.

FIG. 5 is an explanatory diagram of the embodiment of the present invention, showing one example of where the above-described ingress noise blocking device can be installed. In the figure, reference numeral 31 is a two-way amplification unit, 32-1 and 32-2 are distribution units, 33 is terminal equipment, 34 is a two-way amplifier, 35, 37, and 40 are each an ingress noise blocking device, and 36, 38, and 39 are distributors.

The two-way amplification unit 31 amplifies both the upstream and downstream signals traveling to and from the center (not shown) by using the two-way amplifier 35. The ingress noise blocking device 35 can be installed in this two-way amplification unit 31. In that case, upstream signals passed through the distribution units 32-1 and 32-2 are synchronously detected and, if there is a valid upstream signal, the gate switch circuit 5 (see FIG. 2) is turned on to transmit the upstream signal to the center. In the case of a signal consisting only of noise, the gate switch circuit 5 is turned off to block the transmission of ingress noise to the center.

In the case of the ingress noise blocking device 37 installed in the distribution unit 32-1, the distributor 36 separates downstream signals into signals directed to the next distribution unit 32-2 and signals directed to the terminal equipments via the ingress noise blocking device 37, and the distributor 38 distributes the downstream signals to the respective terminal equipments 33; in the reverse direction, upstream signals from the terminal equipments 33 are combined in the distributor 38 and synchronously detected at the ingress noise blocking device 37, and the gate switch circuit 5 is turned on only for a valid upstream signal, to transmit the upstream signal to the center via the distributor 36.

In the case of the ingress noise blocking device 40 installed in the distribution unit 32-2, the ingress noise blocking device 40 is provided for the plurality of terminal equipments 33 connected to the distributor 39. Then, upstream signals from the terminal equipments 33 are synchronously detected, and the gate switch circuit 5 in the ingress noise blocking device 40 is turned on only for a valid upstream signal, to transmit the upstream signal to the center via the distributor 39. If any terminal equipment 33 is removed and the cable end is left open, the upstream signal will consist only of noise; since, in that case, the gate switch circuit 5 in the ingress noise blocking device 40 is turned off, the noise component can be prevented from entering the upstream signals being transmitted from the other terminal equipments 33.

Further, since the ingress noise blocking devices 35, 37, and 40 can each be constructed to operate on, for example, 5 VDC at 100 to 150 mA, a portion of the operating power being supplied to the two-way amplification unit 34 through a cable can, for example, be directed to the ingress noise blocking device 35 installed in the two-way amplification unit 31. Likewise, for the ingress noise blocking devices 37 and 40 installed in the distributions blocks 32-1 and 32-2, power can be supplied through a cable from the two-way amplification unit 31 side. In the case of the ingress noise blocking device 40, since it is provided for the respective terminal equipments 33, the system can be constructed so that the operating power is supplied from user premises via a cable modem or the like at each terminal equipment 33.

In the case of cables installed on utility poles, it is usual to mount the distribution units 32-1 and 32-2 on utility poles, while in the case of underground cables, it is usual to place the distribution units under manholes. Accordingly, if the indicator 7 (see FIG. 2) on each of the ingress noise blocking devices 37 and 40 is constructed to illuminate in two colors, for example, red and green so that the indicator illuminates in red when the upstream signal consists only of noise and the gate switch circuit 5 is turned off, and in green when a valid upstream signal is synchronously detected and the gate switch circuit 5 is turned on, then it becomes possible to identify the system operating state by viewing the indication presented by the indicator 7 on each of the ingress noise blocking devices 37 and 40, and this indication can be effectively used, for example, when locating a fault.

The present invention is not limited to the embodiments disclosed herein, but various changes and modifications may be made; for example, for the synchronous detection controller 6, not only the differential detection design but also the synchronous detection design involving the extraction of a carrier wave can be employed. Furthermore, since the spectrum detector 16 is provided to discriminate between the noise component and the signal component, the spectrum detector 16 can be constructed to detect levels using a band-pass filter having a pass band in the frequency range of the upstream signal in combination with a band-pass filter having a pass band in other frequency range.

As described above, according to the present invention, the ingress noise blocking device including the synchronous detection controller 6 and the gate switch circuit 5 is installed in the upstream signal path leading from the terminal equipment side, where the distributor, two-way amplifier, etc. are provided, to the center side, and only when an upstream signal is synchronously detected, is the gate switch circuit 5 turned on to let the upstream signal pass through; otherwise, the gate switch circuit 5 is turned off to block ingress noise. Accordingly, even in cases where cable end is left open in the system, the present invention has the advantage of being able to reliably suppress noise flowing to the center side.

Further, when the differential detection design is employed for the synchronous detection of the upstream signal at the synchronous detection controller 6, the advantage is that the circuit configuration can be made relatively simple, compact, and economical. This, therefore, offers the advantage that the device can be easily placed inside the distribution unit mounted on a utility pole or the like.

What is claimed is:

1. An ingress noise blocking device comprising:

first and second separation filters for separating upstream and downstream signals using different frequency bands in a cable system;

a gate switch circuit for passing or not passing the upstream signal between the first and second separation filters; and a synchronous detection controller for turning on the gate switch circuit only when the upstream signal is synchronously detected;

wherein the synchronous detection controller has a differential detection circuit configuration which includes a delay circuit for delaying the upstream signal and a synchronous detector for multiplying the upstream signal by the signal delayed by the delay circuit.

2. An ingress noise control system for use in a cable system providing two-way communication using different frequency bands for transmission of upstream and downstream signals, comprising:

an ingress noise blocking device, which includes a synchronous detection controller and a gate switch circuit, and which turns on the gate switch circuit only when an upstream signal is synchronously detected, to pass the upstream signal therethrough, the ingress noise blocking device provided in a transmission path of the upstream signal; and which further includes a spectrum detector for judging whether or not the upstream signal is a valid upstream signal, based on a comparison of the upstream signal level for each of a plurality of distinct predetermined frequencies when the upstream signal is synchronously detected by the synchronous detection controller, and for turning on the gate switch circuit to pass the valid upstream signal therethrough only when the upstream signal is judged to be a valid upstream signal;

wherein the synchronous detection controller has a differential detection circuit configuration which includes a delay circuit for delaying the upstream signal and a synchronous detector for multiplying the upstream signal by the signal delayed by the delay circuit.

3. An ingress noise blocking device comprising:

first and second separation filters for separating upstream and downstream signals using different frequency bands in a cable system;

a gate switch circuit for passing or not passing the upstream signal between the first and second separation filters;

a synchronous detection controller for turning on the gate switch circuit only when the upstream signal is synchronously detected; and a spectrum detector which obtains a spectrum of the upstream signal synchronously detected by the synchronous detection controller and which, based on a comparison of signal levels for each of a plurality of distinct predetermined frequencies, further judges whether or not the upstream signal is a valid upstream signal, and turns on the gate switch circuit only when the upstream signal is judged to be a valid upstream signal;

wherein the synchronous detection controller has a differential detection circuit configuration which includes a delay circuit for delaying the upstream signal and a synchronous detector for multiplying the upstream signal by the signal delayed by the delay circuit.

4. An ingress noise blocking device comprising:

first and second separation filters for separating upstream and downstream signals using different frequency bands in a cable system;

a gate switch circuit for passing or not passing the upstream signal between the first and second separation filters;

a synchronous detection controller for turning on the gate switch circuit only when the upstream signal is synchronously detected; and a synchronous detection judging unit which obtains a spectrum of the upstream signal synchronously detected by the synchronous detection controller and which, based on the ratio of signal levels at predetermined frequencies, judges whether or not the upstream signal is a valid upstream signal, and turns on the gate switch circuit only when the upstream signal is judged to be a valid upstream signal;

wherein the synchronous detection controller has a differential detection circuit configuration which includes a delay circuit for delaying the upstream signal and a synchronous detector for multiplying the upstream signal by the signal delayed by the delay circuit.

5. An ingress noise blocking device comprising:

first and second separation filters for separating upstream and downstream signals using different frequency bands in a cable system;

a gate switch circuit for passing or not passing the upstream signal between the first and second separation filters; and a synchronous detection controller for turning on the gate switch circuit only when the upstream signal is synchronously detected;

wherein the synchronous detection controller comprises;

a band-pass filter for passing only the upstream signal falling within a prescribed frequency band;

a delay circuit for delaying the signal passed through the band-pass filter, a synchronous detection circuit for performing synchronous detection using the signal passed through the band-pass filter and the signal delayed through the delay circuit;

a low-pass filter for generating a baseband signal from a detected signal supplied from the synchronous detection circuit; and a synchronous detection judging unit for judging the presence or absence of the upstream signal based on the presence or absence of the baseband signal from the low-pass filter.

6. An ingress noise blocking device according to claim 5, wherein the synchronous detection controller further includes a spectrum detector for detecting a spectrum of the upstream signal, and wherein the synchronous detection judging unit judges the presence or absence of the upstream signal based on the presence or absence of the baseband signal from the synchronous detection circuit and on spectral characteristics directed by the spectrum detector.

* * * * *